United States Patent
Chen et al.

(10) Patent No.: US 10,178,605 B2
(45) Date of Patent: Jan. 8, 2019

(54) ENHANCED NODE B AND METHOD OF TRANSMITTING PHYSICAL-DOWNLINK CONTROL CHANNELS (PDCCHS) IN A LTE-A SYSTEM

(75) Inventors: Xiaogang Chen, Beijing (CN); Yuan Zhu, Beijing (CN); Yi Hsuan, Sunnyvale, CA (US); Huaning Niu, Milpitas, CA (US); Qinghua Li, San Ramon, CA (US); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/996,624

(22) PCT Filed: Oct. 1, 2011

(86) PCT No.: PCT/US2011/054502
§ 371 (c)(1),
(2), (4) Date: Jun. 21, 2013

(87) PCT Pub. No.: WO2012/134535
PCT Pub. Date: Oct. 4, 2012

(65) Prior Publication Data
US 2014/0044070 A1 Feb. 13, 2014

Related U.S. Application Data

(60) Provisional application No. 61/471,042, filed on Apr. 1, 2011.

(51) Int. Cl.
*H04B 7/04* (2017.01)
*H04W 72/04* (2009.01)
(Continued)

(52) U.S. Cl.
CPC .......... *H04W 48/10* (2013.01); *H04B 7/0456* (2013.01); *H04B 7/0486* (2013.01);
(Continued)

(58) Field of Classification Search
CPC ............. H04W 52/0216; H04W 84/12; H04W 52/0229; H04W 52/0235; Y02B 60/50
(Continued)

(56) References Cited

U.S. PATENT DOCUMENTS

| 2010/0097937 A1 | 4/2010 | Pietraski et al. |
| 2010/0098012 A1 | 4/2010 | Bala et al. |

(Continued)

FOREIGN PATENT DOCUMENTS

| KR | 1020100009463 A | 1/2010 |
| WO | WO-2010101366 A2 | 9/2010 |
| WO | WO-20121345351 | 10/2012 |

OTHER PUBLICATIONS

"International Application Serial No. PCT/US2011/054502, International Search Report dated Feb. 24, 2012", 3 pgs.
(Continued)

*Primary Examiner* — Andrew W Chriss
*Assistant Examiner* — Atique Ahmed
(74) *Attorney, Agent, or Firm* — Schwegman Lundberg & Woessner, P.A.

(57) ABSTRACT

Embodiments of an eNB and method of transmitting PDCCHs are generally described herein. In some embodiments, the eNB may be configured to transmit PDCCHs that are based on a UE-specific reference signal (i.e., a UE-RS). In these embodiments, the UEs may be able to demodulate their PDCCH using a demodulation reference signal (DM-RS) that is specific to the UE (e.g., instead of a common reference signal). The PDCCHs disclosed herein may be suitable the Uu interface of an LTE-A system.

10 Claims, 6 Drawing Sheets

LTE-A SYSTEM

(51) Int. Cl.
| | |
|---|---|
| *H04W 48/10* | (2009.01) |
| *H04B 7/0456* | (2017.01) |
| *H04B 7/06* | (2006.01) |
| *H04L 5/00* | (2006.01) |
| *H04L 12/26* | (2006.01) |
| *H04L 12/721* | (2013.01) |
| *H04L 29/06* | (2006.01) |
| *H04W 24/00* | (2009.01) |
| *H04W 24/02* | (2009.01) |
| *H04W 24/10* | (2009.01) |
| *H04W 28/08* | (2009.01) |
| *H04W 48/12* | (2009.01) |
| *H04W 52/02* | (2009.01) |
| *H04W 52/14* | (2009.01) |
| *H04W 52/18* | (2009.01) |
| *H04W 4/70* | (2018.01) |
| *H04W 72/00* | (2009.01) |
| *H04W 88/02* | (2009.01) |
| *H04W 88/08* | (2009.01) |
| *H04W 92/20* | (2009.01) |
| *H04W 28/04* | (2009.01) |

(52) U.S. Cl.
CPC ......... *H04B 7/0632* (2013.01); *H04B 7/0639* (2013.01); *H04L 5/003* (2013.01); *H04L 5/0037* (2013.01); *H04L 5/0053* (2013.01); *H04L 5/0078* (2013.01); *H04L 5/0094* (2013.01); *H04L 43/50* (2013.01); *H04L 45/70* (2013.01); *H04L 65/608* (2013.01); *H04W 4/70* (2018.02); *H04W 24/00* (2013.01); *H04W 24/02* (2013.01); *H04W 24/10* (2013.01); *H04W 28/08* (2013.01); *H04W 48/12* (2013.01); *H04W 52/0216* (2013.01); *H04W 52/146* (2013.01); *H04W 52/18* (2013.01); *H04W 72/042* (2013.01); *H04W 72/0413* (2013.01); *H04W 72/0453* (2013.01); *H04W 28/04* (2013.01); *H04W 72/00* (2013.01); *H04W 88/02* (2013.01); *H04W 88/08* (2013.01); *H04W 92/20* (2013.01)

(58) Field of Classification Search
USPC .................................................. 370/329, 311
See application file for complete search history.

(56) References Cited

U.S. PATENT DOCUMENTS

| | | | | |
|---|---|---|---|---|
| 2010/0165847 | A1* | 7/2010 | Kamuf | H04L 5/0007 370/241 |
| 2010/0302983 | A1* | 12/2010 | McBeath et al. | 370/311 |
| 2011/0075624 | A1* | 3/2011 | Papasakellariou | H04L 5/0053 370/329 |
| 2011/0085457 | A1* | 4/2011 | Chen | H04L 1/1812 370/252 |
| 2011/0085458 | A1* | 4/2011 | Montojo | H04L 1/0038 370/252 |
| 2011/0170496 | A1* | 7/2011 | Fong et al. | 370/329 |
| 2011/0222629 | A1* | 9/2011 | Lindh | H04B 7/0615 375/296 |
| 2011/0317610 | A1 | 12/2011 | Park et al. | |
| 2012/0027120 | A1* | 2/2012 | Noh | H04L 1/0026 375/295 |
| 2012/0106465 | A1* | 5/2012 | Haghighat | H04W 72/1289 370/329 |
| 2012/0207099 | A1* | 8/2012 | Lindh | H04L 5/0053 370/329 |
| 2013/0039284 | A1* | 2/2013 | Marinier et al. | 370/329 |

OTHER PUBLICATIONS

"International Serial Application No. PCT/US2011/055245, Written Opinion dated Feb. 24, 2012", 4 pgs.

"International Application Serial No. PCT/US2011/054502, International Preliminary Report on Patentability dated Oct. 10, 2013", 6 pgs.

"European Application Serial No. 11862447.7, Extended European Search Report dated Sep. 8, 2014", 9 pgs.

"European Application Serial No. 11862447.7, Office Action dated Nov. 8, 2013", 3 pgs.

"Search Space for Non-interleaved R-PDCCH", 3GPP Draft; R1-105344 R-PDCCH SS Non-Interleaving, 3rd Generation Partnership Project (3GPP), Mobile Competence Centre ; 650, Route Des Lucioles ; F06921 Sophia-Anti Polis Cedex; France, vol. RAN WG1, No. Xi'an, LG Electronics, (Oct. 5, 2010).

"Summary of Offline Session on Relay", 3GPP Draft; R1-111146 Summary of Offline Session on Relay, 3rd Generation Partnership Project (3GPP), Mobile Competence Centre; 650, Route Des Lucioles; F-06921 Sophia-Anti Polis Cedex; France, voi. RAN WG1, No. Taipei, Taiwan, Ericsson, (Feb. 24, 2011).

"Chinese Application Serial No. 201180071276.3, Office Action dated Jul. 6, 2016" w/ Translation , 8 pgs.

"Chinese Application Serial No. 201180071276.3, Office Action dated Dec. 23, 2015" w/ English Translation, 6 pgs.

"Chinese Application Serial No. 201180071276.3, Response filed May 9, 2016 to Office Action dated Dec. 23, 2015", W/ English Translation of Claims, 10 pgs.

"Chinese Application Serial No. 201180071276.3, Response filed Mar. 24, 2017 to Office Action dated Jan. 9, 2017", w/ claims in English, 9 pgs.

* cited by examiner

| CONFIGURATION | CFI | CP | CRS | CSI-RS | UE-RS | CCE(S)/RB | IDLE RE(S)/RB |
|---|---|---|---|---|---|---|---|
| 0 | 2 | NORMAL | 2 | 4 | 4 | 3 | 8 |
| 1 | | | 4 | 4 | 4 | 3 | 4 |
| 2 | | | 2 | 8 | 4 | 3 | 4 |
| 3 | | | 4 | 8 | 4 | 3 | 0 |
| 4 | | EXTENDED | 2 | 4 | 4 | 2 | 16 |
| 5 | | | 4 | 4 | 4 | 2 | 12 |
| 6 | | | 2 | 8 | 4 | 2 | 12 |
| 7 | | | 4 | 8 | 4 | 2 | 8 |
| 8 | 3 | NORMAL | 2 | 4 | 4 | 2 | 32 |
| 9 | | | 4 | 4 | 4 | 2 | 28 |
| 10 | | | 2 | 8 | 4 | 2 | 28 |
| 11 | | | 4 | 8 | 4 | 2 | 24 |
| 12 | | EXTENDED | 2 | 4 | 4 | 2 | 4 |
| 13 | | | 4 | 4 | 4 | 2 | 0 |
| 14 | | | 2 | 8 | 4 | 2 | 0 |
| 15 | | | 4 | 8 | 4 | 1 | 32 |
| 16 | 1 | NORMAL | 2 | 4 | 4 | 3 | 20 |
| 17 | | | 4 | 4 | 4 | 3 | 16 |
| 18 | | | 2 | 8 | 4 | 3 | 16 |
| 19 | | | 4 | 8 | 4 | 3 | 12 |
| 20 | | EXTENDED | 2 | 4 | 4 | 2 | 28 |
| 21 | | | 4 | 4 | 4 | 2 | 24 |
| 22 | | | 2 | 8 | 4 | 2 | 24 |
| 23 | | | 4 | 8 | 4 | 2 | 20 |

501  507  508

*FIG. 5* ns set forth in the claims encompass all available equivalents of those claims.

FIG. 1 is illustrates an eNB and a plurality of UEs in accordance with some embodiments. The eNB 102 and UE 104 may operate as part of an LTE-A network, such as radio-access network (RAN) 106 and may communicate with each other using a plurality of channels. The eNB 102 may communicate with a plurality of UEs 104 using an orthogonal frequency division multiple access (OFDMA) technique in the downlink. The UEs 104 may communicate with the eNB 102 using a single-carrier frequency division multiple access (SC-FDMA) technique in the uplink although this is not a requirement. Downlink channels may include a physical downlink shared channel (PDSCH), and a physical broadcast control channel (PBCCH), and the PDCCH, among others. Uplink channels may include a random access channel (RACH), a physical uplink control channel (PUCCH) and a physical uplink shared channel (PUSCH), among others. The PUSCH is generally shared by several UEs for transmitting information data to the eNB 102 in accordance with the SC-FDMA technique. A PDCCH may be transmitted to each UE 104 to provide control information to a particular UE 104 as discussed in more detail below.

In accordance with some embodiments, the eNB 102 may be configured to transmit PDCCHs that are based on a UE-specific reference signal (i.e., a UE-RS). In these embodiments, UEs 104 may be able to demodulate their PDCCH using a demodulation reference signal (DM-RS) that is specific to the UE (e.g., instead of using a common reference signal). The PDCCHs disclosed herein may be suitable for the Uu interface in an LTE-A system. The Uu interface is the radio interface between a UE 104 and the RAN 106.

In some embodiments, methods of transmitting various PDCCHs are provided. In some other embodiments methods of decoding various PDCCHs are provided.

In accordance with some embodiments, the eNB 102 may be configured to transmit spatially-multiplexed (SM) PDCCHs in a single resource block (RB) to a plurality of UEs 104. In these embodiments, a plurality of spatial-division multiplexed (SDM) layers may be transmitted within the RB and each layer may include a different DM-RS transmitted in non-orthogonal resource elements. Each layer may also include a different PDCCH transmitted on orthogonal resource elements of the RB. In these embodiments, the DM-RSs and the PDCCHs are precoded for an associated layer based on precoding-matrix indicators (PMIs) received from the UEs 104. These embodiments are described in more detail below in reference to FIG. 2.

In accordance with some other embodiments, the eNB 102 may be configured to transmit subset-based PDCCHs in a single RB to a plurality of UEs 104. In these embodiments, a plurality of PDCCHs may be transmitted within a single RB such that each PDCCH is transmitted on a different subset of resource elements of the RB. For each PDCCH, transmitting a DM-RS may be transmitted within the RB such that each DM-RS is transmitted on an orthogonal subset of resource elements of the RB. These embodiments are described in more detail below in reference to FIG. 3.

In accordance with some other embodiments, the eNB 102 may be configured to transmit PDCCHs with multi-user downlink control information (i.e., a MU-DCI) in a single RB to a plurality of UEs 104. In these embodiments, a plurality of SDM layers may be transmitted within a RB. At least a first of the layers may include at least one PDCCH

ENHANCED NODE B AND METHOD OF TRANSMITTING PHYSICAL-DOWNLINK CONTROL CHANNELS (PDCCHS) IN A LTE-A SYSTEM

PRIORITY CLAIM

This application is a U.S. National Stage Filing under 35 U.S.C. 371 from International patent application Ser. No. PCT/US2011/054502, filed Oct. 1, 2011, published on Oct. 4, 2012 as WO/2012/134535 A1, which claims the benefit of priority under 35 USC 119(e) to U.S. Provisional Patent Application Ser. No. 61/471,042, filed Apr. 1, 2011, [reference number P376634Z], both of which are incorporated herein by reference in their entirety.

TECHNICAL FIELD

Embodiments pertain to wireless communications. Some embodiments relate to the Evolved Universal Terrestrial Radio Access Network (E-UTRAN) standard of the third-generation partnership project (3GPP), Releases 10 and later, known as Long Term Evolution (LTE) Advanced and referred to as LTE-A. Some embodiments relate to the transmission of downlink control channels in LTE-A systems.

BACKGROUND

In a 3GPP LTE network, user equipment (UE) are provided control information from an enhanced or evolved Node B (eNB) over a downlink control channel, such as a physical-downlink control channel (PDCCH). The current configuration of these control channels utilize excess bandwidth, limit scheduling flexibility, and use a common reference signal for demodulation. This configuration limits coverage and capacity of the downlink control channel.

Thus, there are general needs for an eNB and methods for transmitting downlink control channels that utilize less bandwidth, increase scheduling flexibility, and do not require the use of a common reference signal for demodulation.

BRIEF DESCRIPTION OF THE DRAWINGS

FIG. 5 is a table illustrating the number of control-channel elements (CCEs) and idle resource element per resource block.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodime transmitted in orthogonal resource elements of the RB. A second of the SDM layers may include at least one other PDCCH transmitted in the same resource elements as one of the PDCCHs of the first of the layers. A different DM-RS for each PDCCH may be transmitted. Each DM-RS may be transmitted on an orthogonal subset of resource elements of the RB within corresponding symbol-duration times. In an example embodiment, a first and a second PDCCH in the first layer may be spatially multiplexed to construct a MU-DCI. A third PDCCH transmitted in the second layer may be a single user DCI (SU-DCI), although this is not a requirement. In this example, both a MU-DCI and a SU-DCI can exist in the same RB. These embodiments are described in more detail below in reference to FIG. 5.

In accordance with some embodiments, the eNB 102 may utilize two or more antennas and the UEs 104 may utilize two or more antennas to allow for multiple-input multiple output (MIMO) communications. In some embodiments, the eNB 102 may utilize up to eight or more antennas and may be configured for multi-user (MU) MIMO (MU-MIMO) communications. In these embodiments, symbols for each UE 104 may be specifically precoded prior to downlink transmission on the PDSCH.

The eNB 102 and the UEs 104 may include several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may include one or more processes operating on one or more processing elements. In addition, the eNB 102 and the UEs 104 may each include physical-layer circuitry for transmitting and receiving radio-frequency signals and media-access control (MAC) layer circuitry for controlling access to the wireless medium.

Figure 1:
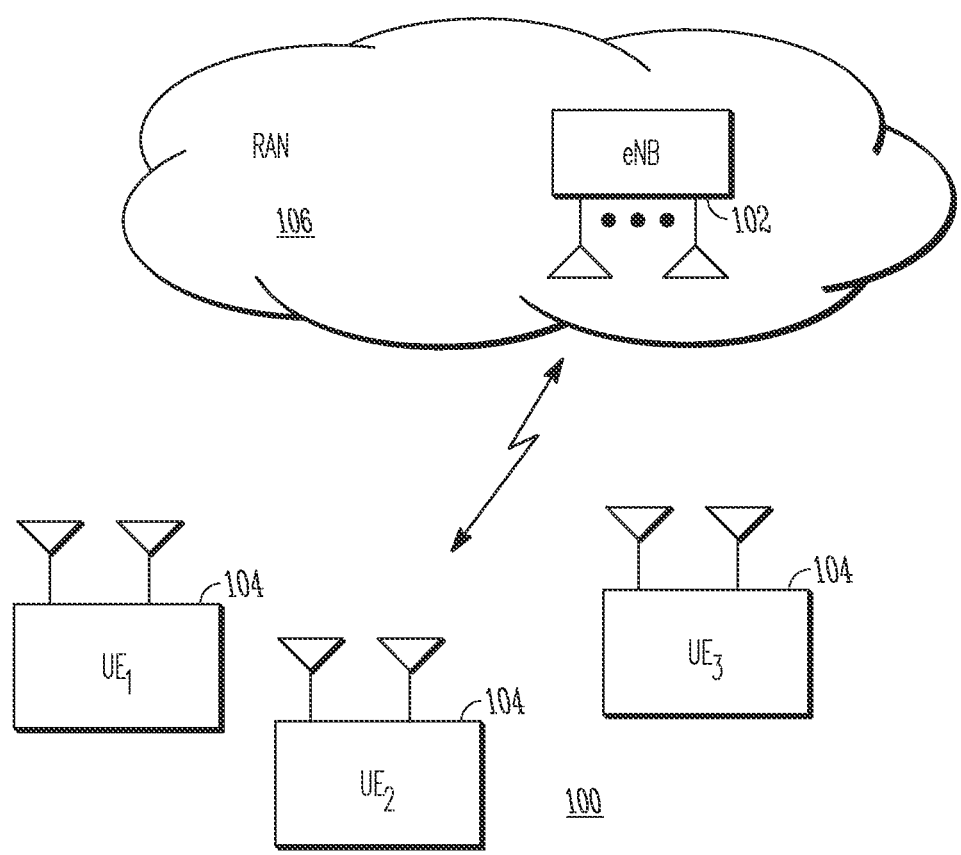
FIG. 1 is illustrates an eNB and a plurality of UEs in accordance with some embodiments.
Figure 2:
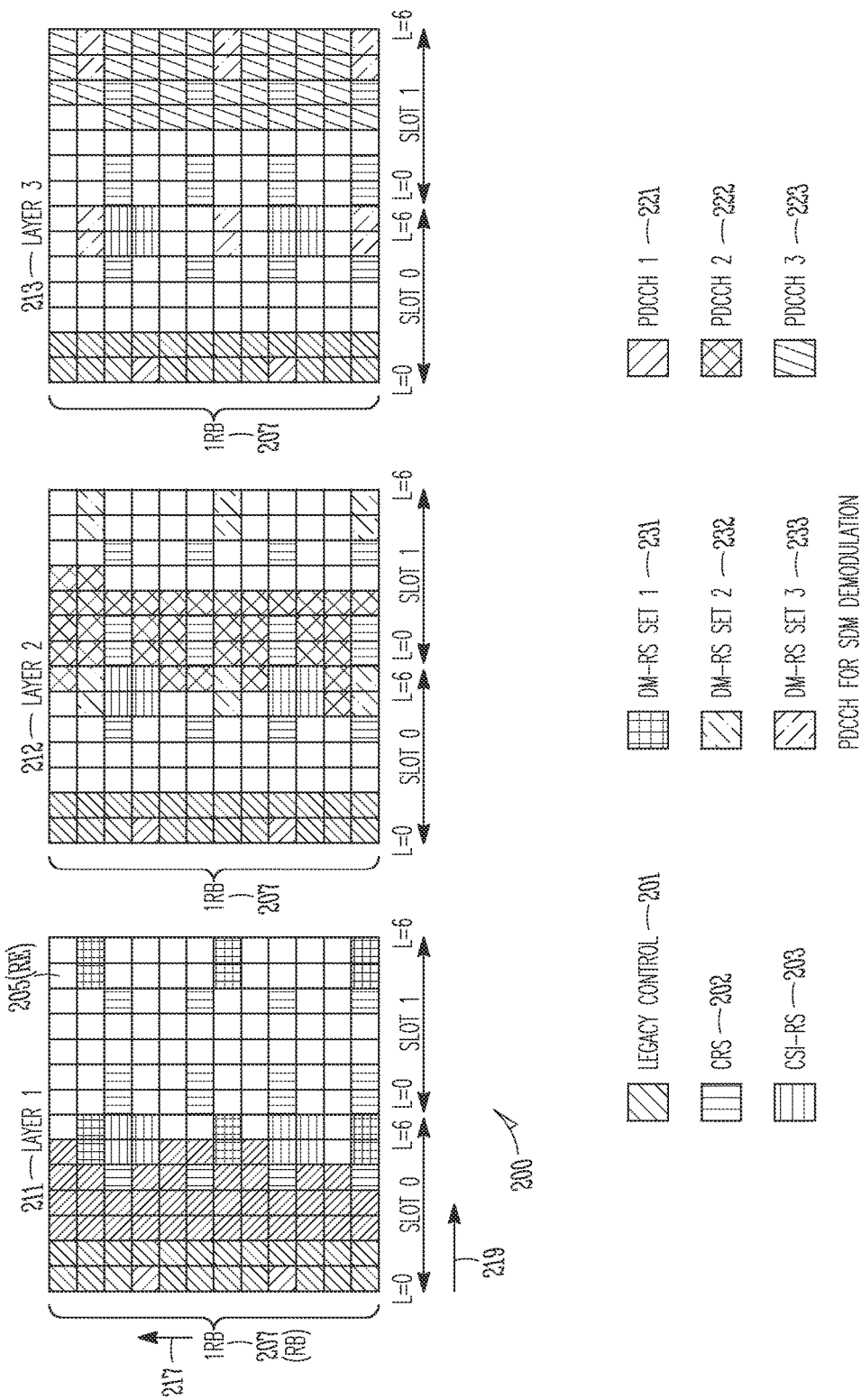
FIG. 2 illustrates spatially-multiplexed PDCCHs in accordance with some embodiments.

FIG. 2 illustrates spatially-multiplexed PDCCHs in accordance with some embodiments. In FIG. 2, different layers 211, 212, and 213 of RB 207 are illustrated. A first PDCCH 221 is transmitted at a first layer 211 on a first set of resource elements 205, a second PDCCH 222 is transmitted at a second layer 212 on a second set of resource elements 205, and a third PDCCH 223 is transmitted at a third layer 213 on a third set of resource elements. Accordingly, the resource elements of each PDCCH 221, 222 and 223 are orthogonal in both time and frequency, as well as separated spatially (i.e., by precoding) since they are transmitted at different layers. Although FIG. 2 illustrates only three PDCCHs for transmission to three UEs 104 (FIG. 1), the scope of the embodiments is not limited in this respect and is applicable to the transmission of many PDCCHs to many UEs.

The use of spatial-domain multiplexing or spatial-division multiplexing for PDCCH transmissions provides for an increase in system capacity providing for the allocation of resources of more than one UE in a single RB. In these embodiments, both the eNB 102 (FIG. 1) and the UEs 104 may utilize two or more antennas to implement spatial multiplexing. In some embodiments, (i.e., 8Tx embodiments) the eNB 102 may utilize up to eight or more antennas.

In the example illustrated in FIG. 2, each resource element (RE) 205 may comprise one subcarrier for a duration of one OFDM symbol. Each RB 207 may span several (e.g., up to twelve or more) subcarriers in the frequency direction 217 and may have a duration of one or two slots (e.g., up to fourteen or more OFDM symbols) in the time direction 219. In the illustrated embodiments, each RB 207 may comprise two slots (shown as slot 0 and slot 1) in which each slot has a duration of seven OFDM symbols (shown as 1=0 through 1=6). A LTE-configured radio frame (e.g., a downlink subframe), for example, may comprise a set of many RBs 207 that are orthogonal in time and in frequency.

In accordance with some embodiments, the eNB 102 may be configured to transmit spatially-multiplexed PDCCHs 221, 222 and 223 in a single RB 207 to a plurality of UEs 104. In these embodiments, the eNB 102 may transmit within the RB 207 a plurality of SDM layers 211, 212, and 213. Each layer 211, 212, and 213 may include a different DM-RS 231 232 or 233 that is transmitted in non-orthogonal resource elements 205 of the RB 207. Each layer 211, 212, and 213 may include a different PDCCH 221, 222 or 223 transmitted on orthogonal resource elements 205 of the RB 207. In these embodiments, each DM-RS 231, 232 and 233 and each PDCCH 221, 222 and 223 may be precoded for an associated layer 211, 212, or 213 based on PMIs received from the UEs 104.

In some embodiments, the DM-RSs 231, 232 or 233 are used by the UEs 104 to demodulate downlink control information (DCI) carried by their PDCCH 221, 222 and 223. The DCI may include, among other things, resource assignments and control information for the associated UEs 104. In these embodiments, each UE 104 may have a dedicated DM-RS. The resource assignments in each PDCCH 221, 222 and 223 may include a resource allocation (RA) for one of the UEs 104. The RA may be an allocation of resources on a shared data channel (i.e., a scheduling grant on the PDCCH) for subsequent resources on the PDSCH.

In some embodiments, each PDCCH may be transmitted by one or more control channel elements (CCEs). The number of CCEs used for transmission of a particular PDCCH may be determined by the eNB 102 and may be based on channel conditions. Each CCE may correspond to physical REs of a resource element group.

In some embodiments, legacy control information 201, a common reference signal (CRS) 202, and a channel-state information reference signal (CSI-RS) 203 may be transmitted in orthogonal resource elements 205 of the RB 207 across the plurality of layers 211, 212, 213 without precoding. The legacy control information 201, CRS 202, and the CSI-RS 203 are transmitted without precoding, while the DM-RSs and the PDCCHs are precoded. In some embodiments, the legacy control information 201, CRS 202, and the CSI-RS 203 may be transmitted on the particular REs of a RB 207 as illustrated in FIG. 2. Each the DM-RS 231, 232 or 233 may also be transmitted on the particular REs 205 of a RB 207 as illustrated in FIG. 2.

In some embodiments, each DM-RS 231, 232 and 233 may comprise a UE-specific reference signal (UE-RS). In these embodiments, each UE 104 has a unique DM-RS that is used for demodulating its control information (e.g., the DCI).

Prior to transmitting the PDCCHs, the eNB 102 may be configured to map a first PDCCH 221 to a first set of resource elements at the first layer 211, map a second PDCCH 222 to a second set of resource elements at the second layer 212, and map a third PDCCH 223 to a third set of resource elements at the third layer 213. The first, second and third sets of resource elements may comprise resource elements that are orthogonal in both time and frequency. In these embodiments, PDCCH information bits may be mapped to physical resource elements on a set of OFDM symbols, as indicated by a physical control format indicator channel (i.e., the PCFICH). In these embodiments, nothing is transmitted in the first set of resource elements at the second and third layers, nothing is transmitted in the second set of resource elements at the first and third layers, and nothing is transmitted in the third set of resource elements at the first and second layers. This may reduce interference between each PDCCH.

In some embodiments, the mapping may include excluding REs at all layers that are reserved for the DM-RSs 231, 232 or 233 and excluding REs at all layers reserved for the legacy control information 201, the CRS 202 and the CSI-RS 203. In some LTE-A embodiments, the single RB comprises twelve subcarriers for a duration of up to fourteen OFDM symbols of two slots, although the scope of the embodiments is not limited in this respect as embodiments are applicable to other RB configurations.

Figure 3:
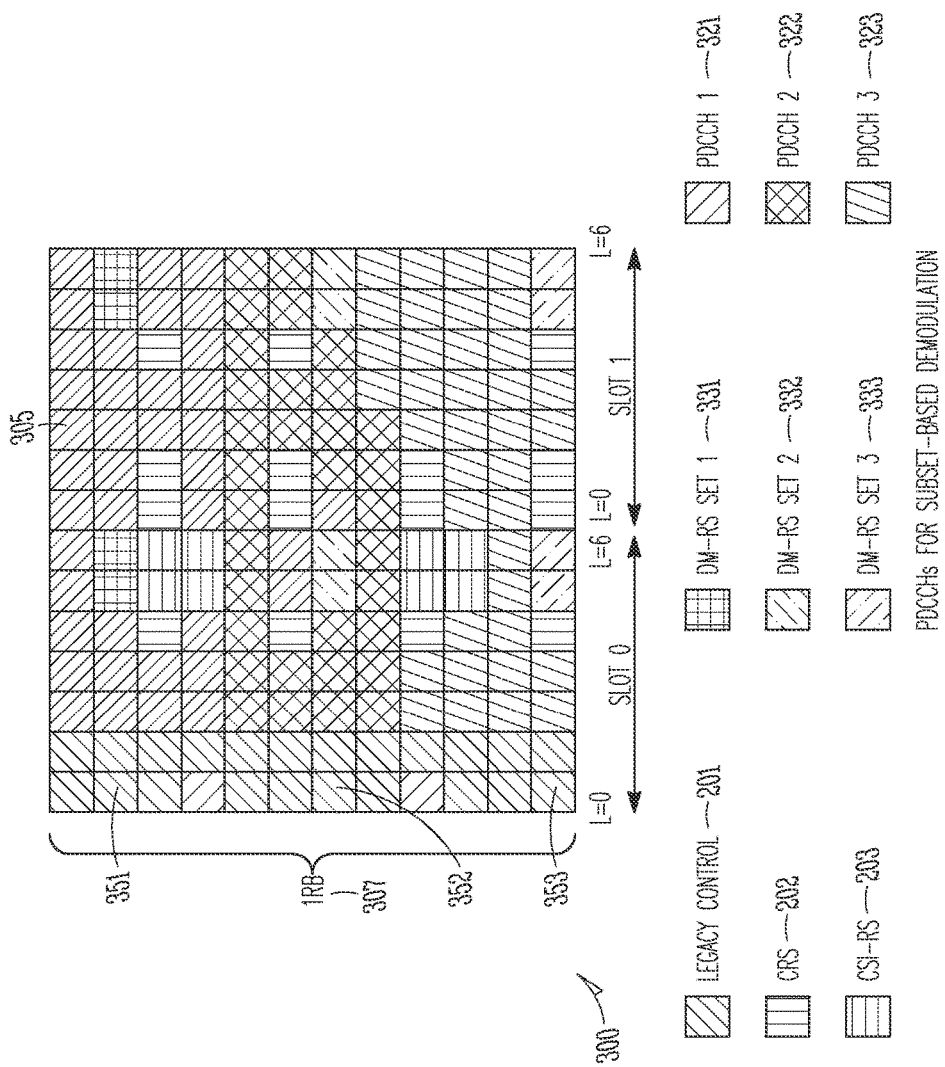
FIG. 3 illustrates PDCCHs for subset-based demodulation in accordance with some embodiments.

FIG. 3 illustrates PDCCHs for subset-based demodulation in accordance with some embodiments. In these embodiments, the eNB 102 (FIG. 1) may be configured for transmission of subset-based PDCCHs in a single RB 307 to a plurality of UEs 104 (FIG. 1). The eNB 102 may transmit a plurality of PDCCHs 321, 322 and 323 within single RB 307 such that each PDCCH is transmitted on a different subset of resource elements 305 of the RB 307. For each PDCCH, the eNB 102 may transmit a DM-RS 331, 332 or 333 within the RB 307. Each DM-RS may be transmitted on an orthogonal subset of resource elements 305 of the RB 307 as illustrated.

In these embodiments, each DM-RS 331, 332 and 333 is transmitted on a different subcarrier frequency 351, 352 or 353 within corresponding symbol-duration times. The different subsets of resource elements 305 that are used for the transmission of the PDCCH are orthogonal in both frequency and time.

In these embodiments, each PDCCH 321, 322 and 323 is transmitted by one or more CCEs depending on the aggregation level. For an aggregation level of one, each PDCCH 321, 322 and 323 may be transmitted by one CCE. For an aggregation level of two, each PDCCH 321, 322 and 323 may be transmitted by two CCEs, etc.

In some embodiments in which a UE 104 provides wideband PMI feedback, the eNB 102 may be configured to precode the PDCCH with the wideband PMI. In case when more than one layer is used for PDSCH transmission, the eNB 102 may be configured to use a precoding vector in the first layer of the precoder indicated by the PMI as the precoder for PDCCH.

In embodiments in which a UE 104 provides subband PMI feedback, if the PDSCH overlaps with the PDCCH, the precoder used for the PDCCH may be configured to align with the precoder for the PDSCH in the same virtual resource block (VRB). If the PDSCH is transmitted by more than one layer, the same scheme used in wideband feedback may be applied. If the PDSCH does not overlap with the PDCCH, the eNB 102 may determine the implementation. In these embodiments, the same precoder may be used if the PDSCH overlaps with the PDCCH. In some embodiments, the PDCCH may use the precoder for the first layer if the PDSCH is transmitted with more than one layer.

Figure 4:
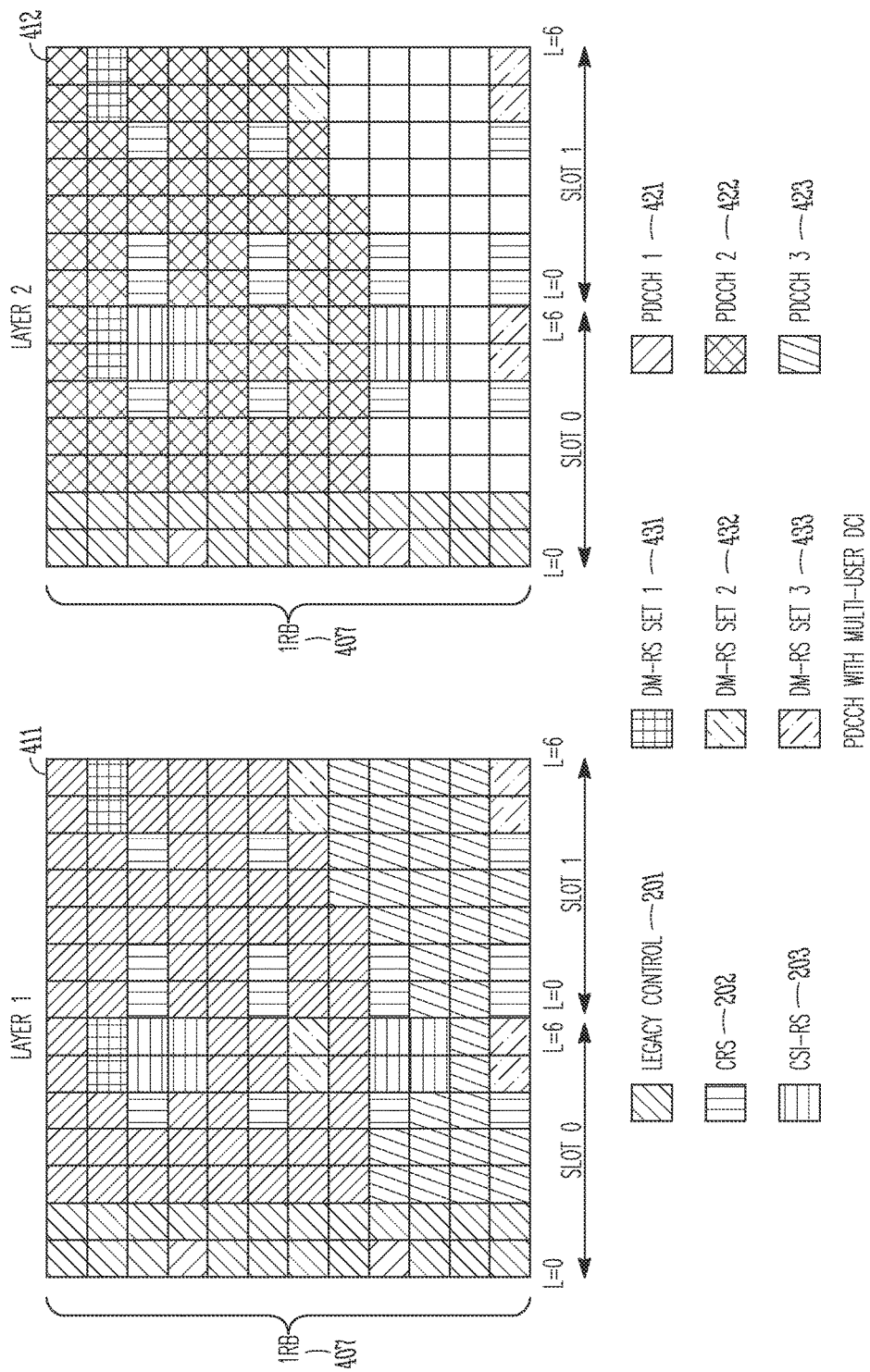
FIG. 4 illustrates PDCCHs with multi-user downlink control information (DCI) in accordance with some embodiments.

FIG. 4 illustrates PDCCHs with multi-user DCI in accordance with some embodiments. In these embodiments, eNB 102 (FIG. 1) may be configured to transmit PDCCHs 421 and 423 with a multi-user DCI in a single RB 407 to a plurality of UEs 104. In these embodiments, the eNB 102 may transmit within the RB 407 a plurality of SDM layers 411 and 412. At least a first of the layers 411 may include two PDCCHs 421, 423 transmitted in orthogonal resource elements of the RB 407. A second of the SDM layers 412 may include at least one other PDCCH 422 transmitted in the same resource elements as one of the PDCCHs of the first of the layers 411. The eNB 102 may transmit a different DM-RS 431, 432 and 433 for each PDCCH within the RB 407. Each DM-RS 431, 432 and 433 may be transmitted on an orthogonal subset of resource elements of the RB 407 within corresponding symbol-duration times. In other words, each DM-RS 431, 432 and 433 may be transmitted during the same symbol times (shown horizontally in FIG. 4) but on different subcarriers (shown vertically in FIG. 4). As illustrated in FIG. 4, DM-RS 431, 432 and 433 are transmitted during symbols five and six of slot one and symbols five and six of slot two.

In some embodiments, the PDCCHs 421 and 422 of the first layer may be precoded with a same precoding vector, and the PDCCH 423 of the second layer may be precoded 412 with a different precoding vector. The DM-RSs 431, 432 and 433 may be precoded by the corresponding precoder. In these example embodiments, DM-RS 431 and DM-RS 432 may both be precoded with a first precoder and DM-RS 433 may be precoded with a second precoder. In these example embodiments, the first PDCCH 421 and the second PDCCH 422 in the first layer 411 may be spatially multiplexed to construct a MU-DCI, and the third PDCCH 423 in the second layer 412 may provide a single user DCI (SU-DCI). In this way, both a MU-DCI and a SU-DCI can exist in the same RB 407.

The use of a multi-user DCI may be used to further increase the capacity of the PDCCHs. In some embodiments, through the use of DM-RSs, the implementation of MU-DCI may be similar to an implementation of MU-MIMO. As illustrated in FIG. 4, three PDCCHs may be scheduled in one VRB, and two of the PDCCHs may have an aggregation level of two and the other PDCCH may have an aggregation level of one. As an example, the PDCCHs may be paired as illustrated in FIG. 4. In these embodiments, DM-RS 431 (set 1) and DM-RS 432 (set 2) may be used to demodulate PDCCH 421 and PDCCH 422 respectively with an aggregation level of two and DM-RS 433 (set 3) may be used to demodulate PDCCH 423. These specific embodiments may be extended to a more general case, where the PDCCHs with different aggregation levels are paired together. Because the power for each PDCCH is decreased a half due to MU pairing, there may be are some performance loss compared with single user (SU) SU-DCI, but better performance than that of the PDCCH configuration of 3GPP LTE Rel.10 may be achieved.

FIG. 5 is a table illustrating the number of CCEs and idle resource element per RB. For each PDCCH configuration 501, the number of CCEs per RB is illustrated in column 507 and the number of available or idle resource elements per RB is illustrated in column 508. Embodiments of the present invention take advantage of these available resource elements to make more efficient use of the available bandwidth.

Figure 6:
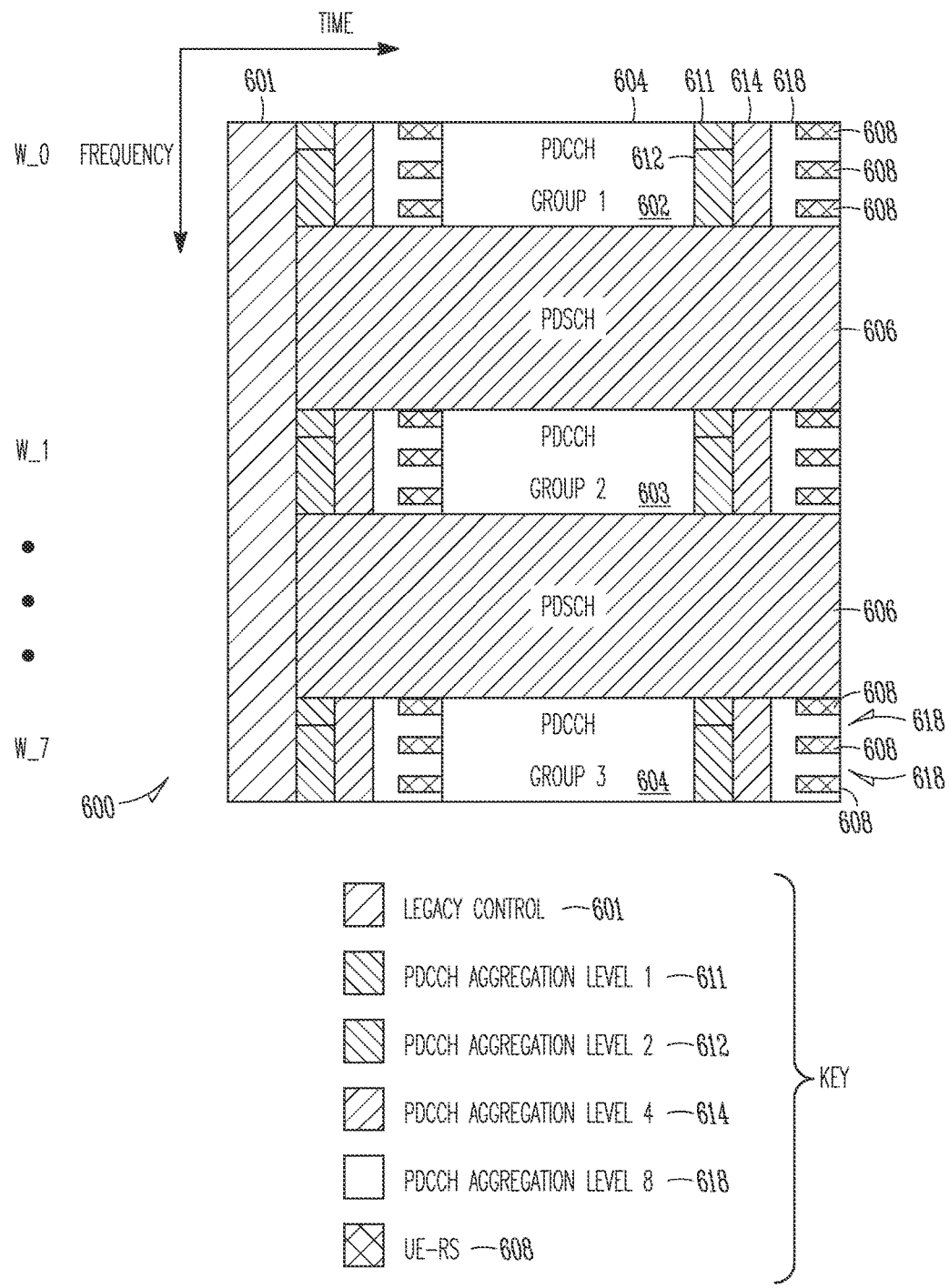
FIG. 6 illustrates a blind decoding search space region in accordance with some embodiments.

FIG. 6 illustrates a blind decoding search space region in accordance with some embodiments. Search space region 600 includes legacy control region 601, PDCCH group 1 region 602, PDCCH group 2 region 603, and PDCCH group 3 region 604. The PDCCH regions may include a PDCCH 611 for aggregation level 1, a PDCCH 612 for aggregation level 2, a PDCCH 614 for aggregation level 4, a PDCCH 618 for aggregation level 8, and regions 608 for the UE-RS. In these embodiments, blind decoding may be kept to an acceptable number for the Uu interface. If a UE 104 (FIG.

1) that is configured to operate in accordance with 3GPP LTE Rel.11 should search both the legacy control region 601 and the UE-RS based PDCCH region 604 for UE specific DCI. The DCI may be provided in both of the two regions, although this is not a requirement. In these embodiments, semi-statistic high layer signaling may be provided to indicate to a UEs 104 which PDCCH region (e.g., legacy or UE-RS) should be searched for blind decoding.

In high-mobility situations, transmit diversity may also be used for DCI transmission in the legacy PDCCH region 601. Open loop precoding may also be used for PDCCH transmission based on the UE specific reference signal. As shown in FIG. 6, one PDCCH is distributed across multiple PDCCH groups and precoded by different precoders that are predefined and configurable for each PDCCH group. $W_0$ to $W_7$ are code words may be selected, for example, from Table 6.3.4.2.3-2 or Table 6.3.4.2.3-3 of 3GPP T.S. 36.211 a00 according to different configurations of transmit antenna ports. This embodiment may favor a UEs 104 with higher mobility through frequency diversity and may improve the performance of PDCCH decoding.

Furthermore, a predefined precoder for different PDCCH groups may be cycled as a function of the subframe to provide time domain diversity gain. For example, $$W_{DCIGroup_i} = W_i, \begin{cases} i = 1, 3, 5, \ldots 15. \text{ if } \mathrm{mod}(N_{subframe}, 2) = 0 \\ i = 0, 2, 4, \ldots 14. \text{ if } \mathrm{mod}(N_{subframe}, 2) = 1 \end{cases}$$

In these embodiments, UE-RS based open loop for PDCCH transmission may be used for high mobility UEs.

In summary, embodiments of an eNB 102 and method of transmitting PDCCHs in an LTE-A system are generally described herein. In some embodiments, the eNB 102 may be configured to transmit PDCCHs that are based on a UE-specific reference signal. In these embodiments, the UEs 104 may be able to demodulate their PDCCH using DM-RS that is specific to the UE (e.g., instead of a common reference signal). The PDCCHs disclosed herein may be suitable the Uu interface of an LTE-A system.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the eNB 102 and the UEs 104 may include one or more processors and may be configured with instructions stored on a non-tangible computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A User Equipment (UE) comprising processing circuitry to:
   receive, instructions for monitoring a set of downlink control channels; and
   monitor, using the instructions, the set of downlink control channels in a UE-specific search space of a downlink subframe, the downlink subframe for monitoring being indicated by higher layer signaling, wherein the set is mapped to regions of resource elements of the UE-specific search space such that at least some resource elements are reserved for a legacy physical downlink control channel (PDCCH) region and some resource elements are reserved for a non-legacy, PDCCH region, the UE is configured to search both the legacy PDCCH region and the non-legacy PDCCH region for downlink control information (DCI), and wherein higher layer signaling instructs the UE to search either of the legacy PDCCH region or the non-legacy PDCCH region for blind decoding, wherein the non-legacy PDCCH region is based on a UE-specific reference signal (UE-RS), wherein a downlink control channel of the set of downlink control channels is distributed across a plurality of enhanced resource element groups (EREGs) in the HE-specific search space, and wherein the UE further comprises a plurality of antenna ports, wherein each EREG of the plurality of EREGs is precoded with a value based on a configuration of the plurality of antenna ports.

2. The UE of claim 1, wherein the receiving is through higher layer signaling.

3. The UE of claim 1, wherein
   the set is mapped to regions of resource elements of the UE-specific search space such that at least some resource elements are reserved for a cell-specific reference signal.

4. The UE of claim 1, wherein
   the set is mapped to regions of resource elements of the UE-specific search space such that at least some resource elements are reserved for a channel-state information (CSI) reference signals.

5. The UE of claim 1, wherein the UE comprises a file storage memory.

6. A method of monitoring downlink control channels, the method comprising:
   receiving, at a user equipment (UE), instructions for monitoring a set of downlink control channels;
   monitoring, using the instructions, the set of downlink control channels in a user equipment (UE)-specific search space of a downlink subframe, the downlink subframe being mapped to reserve at least some resource elements for a legacy physical downlink control channel (PDCCH) region and some resource elements are reserved for a non-legacy PDCCH region, wherein the UE is configured to search both the legacy PDCCH region and the non-legacy PDCCH region for downlink control information (DCI), and wherein the higher layer signaling instructs the UE to search either of the legacy PDCCH region or the non-legacy PDCCH region for blind decoding, wherein the non-legacy PDCCH region is based on a UE-specific reference signal (UE-RS), wherein a downlink control channel of the set of downlink control channels is distributed across a plurality of enhanced resource element groups (EREGs) in the UE-specific search space, and each EREG of the plurality of EREGs is precoded with a value based on a configuration of UE antenna ports.

7. The method of claim 6, wherein the receiving is through higher layer signaling.

8. The method of claim 6, wherein the set is further mapped such that
- at least some resource elements are reserved for a cell-specific reference signals, and
- at least some resource elements are reserved for a channel-specific information (CSI) reference signals.

9. A non-transitory computer-readable medium comprising instructions that, when executed on a machine, cause the machine to:
- receive, through higher layer signaling, instructions for monitoring a set of downlink control channels; and
- monitor, using the instructions, the set of downlink control channels in a user equipment (UE)-specific search space of a downlink subframe, the downlink subframe being mapped to reserve at least some resource elements for a legacy physical downlink control channel (PDCCH) region and some resource elements are reserved for a non-legacy PDCCH region, wherein the instructions further cause the machine to search both the legacy PDCCH region and the non-legacy PDCCH region for downlink control information (DCI), and wherein the higher layer signaling instructs the machine to search either of the legacy PDCCH region or the non-legacy PDCCH region for blind decoding, wherein the non-legacy PDCCH region is based on a UE-specific reference signal (UE-RS) wherein a downlink control channel of the set of downlink control channels is distributed across a plurality of enhanced resource element groups (EREGs) in the UE-specific search space, and
- an EREG of the plurality of EREGs is precoded with a value based on a configuration of UE antenna ports.

10. The non-transitory computer-readable medium of claim 9 comprising instructions that, when executed on the machine, cause the machine to:
- decode a downlink control channel of the set of downlink control channels using a UE-specific reference signal, wherein
- the set is mapped such that at least some resource elements are reserved for cell-specific reference signals, at least some resource elements are reserved for a channel-specific information (CSI) reference signals, and at least some resource elements are reserved for UE-specific reference signals.

* * * * *

UNITED STATES PATENT AND TRADEMARK OFFICE
CERTIFICATE OF CORRECTION

PATENT NO. : 10,178,605 B2
APPLICATION NO. : 13/996624
DATED : January 8, 2019
INVENTOR(S) : Chen et al.

Page 1 of 1

It is certified that error appears in the above-identified patent and that said Letters Patent is hereby corrected as shown below:

In the Claims

In Column 8, Line 25, in Claim 1, delete "HE-specific" and insert --UE-specific--
In Column 9, Line 4, in Claim 8, after "that", insert --:--

Signed and Sealed this
Twenty-first Day of April, 2020

Andrei Iancu
*Director of the United States Patent and Trademark Office*